June 11, 1963  W. D. LANDGRAF  3,093,231
REVERSING MECHANISM AND RIBBON ATTACHMENT
Filed April 23, 1962  2 Sheets-Sheet 1
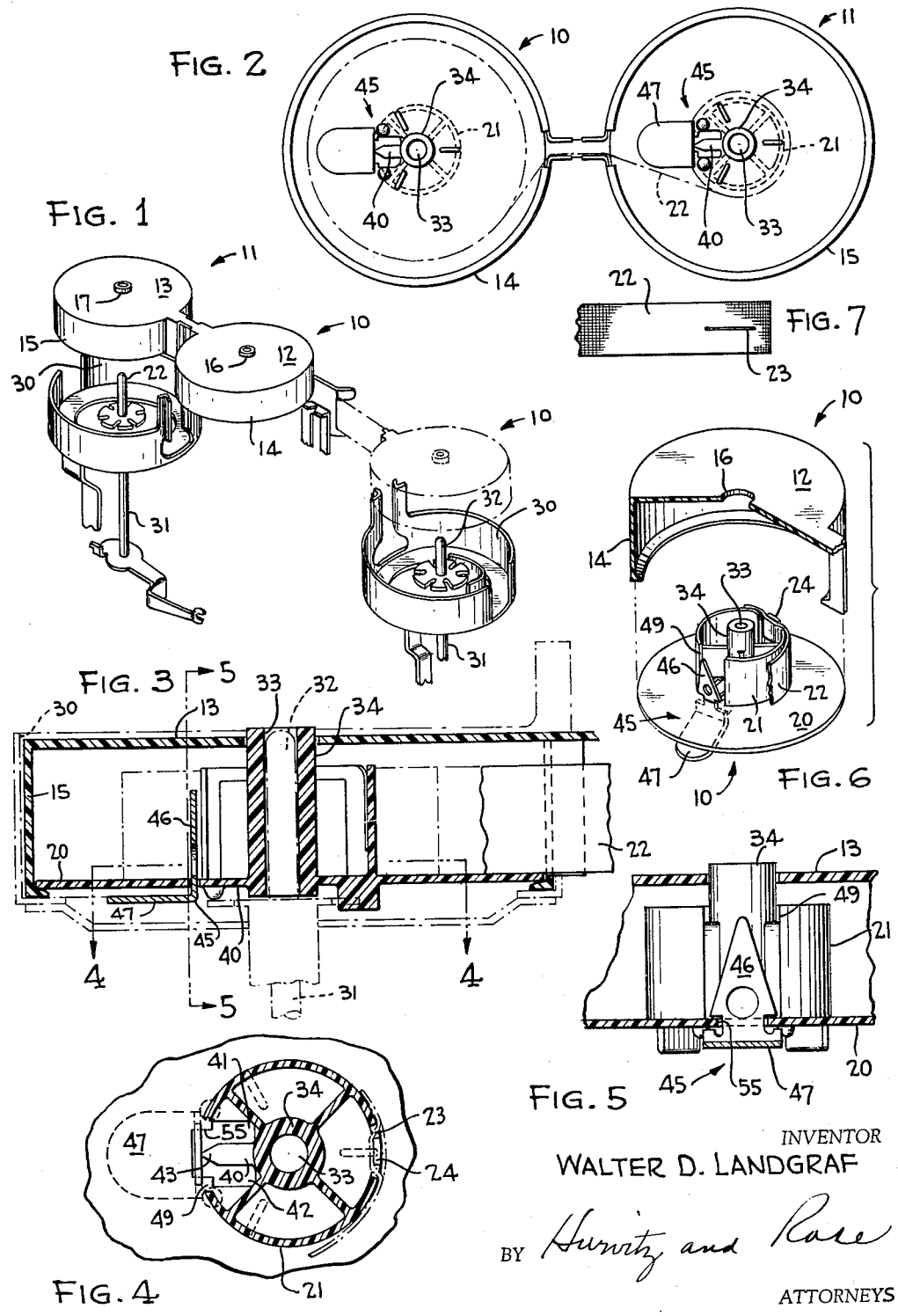
INVENTOR
WALTER D. LANDGRAF
BY Hurwitz and Rose
ATTORNEYS June 11, 1963 W. D. LANDGRAF 3,093,231
REVERSING MECHANISM AND RIBBON ATTACHMENT
Filed April 23, 1962 2 Sheets-Sheet 2
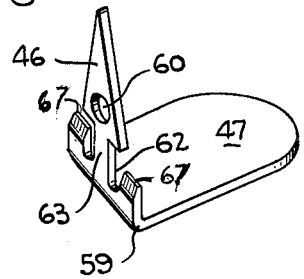
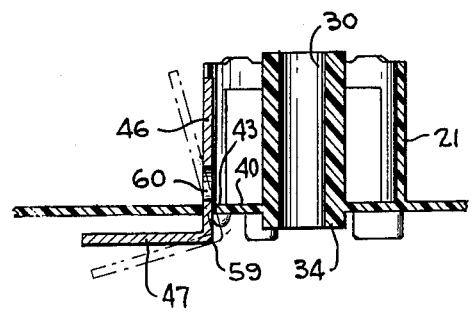
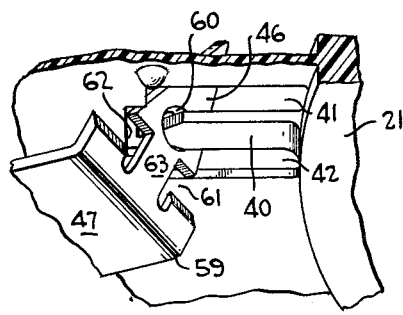
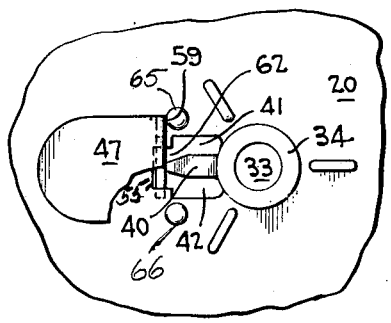
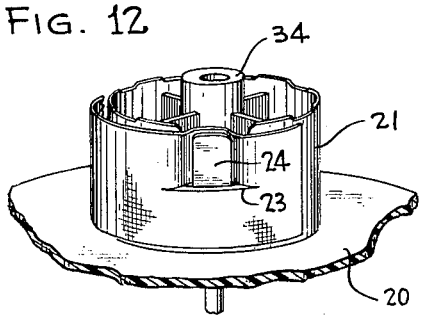
INVENTOR
WALTER D. LANDGRAF
BY *Hurvitz and Rose*
ATTORNEYS

United States Patent Office 3,093,231
Patented June 11, 1963

3,093,231
REVERSING MECHANISM AND RIBBON ATTACHMENT
Walter D. Landgraf, 4808 W. 96th Place, Oak Lawn, Ill.
Filed Apr. 23, 1962, Ser. No. 189,526
22 Claims. (Cl. 197—175)

The present application is a continuation-in-part of Serial No. 150,073, filed November 3, 1961, entitled "Universal Spool."

The present invention relates generally to spools for inked printing ribbons and more particularly to spools having novel provision for securing a ribbon end to the cartridge, and to ribbon reversing mechanism for such cartridges.

An object of the invention is to provide a novel typewriter ribbon and spool assembly in which the ribbon is provided at its end with a longitudinal slot, which can be slipped on an element of the hub of the spool.

Another object of the invention is to provide a plastic typewriter ribbon spool having an integral anchoring post which is formed in the hub of the spool by eliminating material from the rim of the hub, the ribbon being provided with an opening adjacent its end which slips over the post to secure the ribbon end to the hub.

A further object of the invention resides in the provision of a novel reversing mechanism, secured to the spool.

Another object of the invention is to provide a unitary plastic spool to which a novel reversal triggering element can be readily assembled, the latter consisting solely of an L-shaped metallic element.

A further object of the invention resides in the provision of a trigger mechanism for a typewriter spool which is not spring urged and which can be assembled into operative condition in a typewriter spool by a simple insertion operation, wherein the spool is a unitary plastic element having no metallic components.

The above and still further objects, features and advantages of the present invention will become apparent upon consideration of the following detailed description of one specific embodiment thereof, especially when taken in conjunction with the accompanying drawings, wherein:

FIGURE 1 is an exploded view in perspective of a typewriter spool assembly according to the invention;

FIGURE 2 is a view in plan of the spool assembly of FIGURE 1;

FIGURE 3 is a view in transverse section of a spool taken from the assembly of FIGURES 1 and 2;

FIGURE 4 is a view in section taken on the line 4—4 of FIGURE 3, with ribbon end attached;

FIGURE 5 is a view in section taken on the line 5—5 of FIGURE 3;

FIGURE 6 is an exploded view in perspective of the spool of FIGURES 4 and 5, with ribbon end attached;

FIGURE 7 is a view in plan of a ribbon end with attaching slit;

FIGURE 8 is a view in perspective of the trigger of FIGURES 4 and 5;

FIGURE 9 is a view in section showing the trigger of FIGURE 8 in operative position on a spool;

FIGURE 10 is a partial view in perspective of the trigger of FIGURE 8 in process of being inserted in a spool;

FIGURE 11 is a plan view, partially broken away, of the trigger of FIGURE 8 in position on a spool; and FIGURE 12 is a view in side elevation, corresponding with FIGURE 4, illustrating a ribbon end secured to a spool.

Referring now to the drawings, the reference numeral 10 denotes one cup and the reference numeral 11 another cup of a twin cup inked ribbon cartridge. The cups 10 and 11 each include bases 12, 13, cylindrical walls 14, 15, and axial openings 16, 17 in the bases, respectively. Identical spool elements 18 are provided for the cups 10 and 11.

The spool elements 18 include disc-shaped flanges 20 acting as cover plates which have slightly smaller diameters than the inner diameters of cylindrical walls 14, 15, and hence fit close but rotationally therein. Extending centrally from each flange 20 is a walled hub 21, on which may be wound one end of a ribbon 22.

To secure the ribbon 22 to the hub 21 each ribbon end is provided with a longitudinally extending slit or cut, 23, therein, without more, which slides over an anchoring post 24, formed by omitting, on either side of the post, some of the material which forms the rim of the hub 21. The slit may be made centrally of the width of the ribbon, although this is optional, and openings of other shape than a slit may be preferred. Use of a slit has the advantage in manufacturing that no ribbon material is removed in forming the slit, and that a simple tool suffices to accomplish the slitting. Additionally, the ribbon end conforms precisely with the hub 21, and forms no radical protuberances, as is the case where the ribbon is folded over at its end, or contains eyelets, hooks or the like, the cost of such insertions in the ends of ribbons is considerable in relation to other costs involved.

The ribbon spools of the present invention are adapted to be inserted in the ribbon wells 30 of certain commercial typewriters, to which are secured mechanisms 31 for actuating the spools when the typewriter keys are actuated and the carriage feeds. The latter mechanism includes a pin 32 which extends into a mating opening 33 in a boss 34 located interiorly of hub 21.

Extending radially outwardly from hub 34, in a plane parallel to the plane of flange 20, is a projection 40, having a gap 41, 42 on either side, and which terminates adjacent the inner wall of the rim of hub 21, in a relatively sharp point 43. A trigger 45, fabricated of metal, is interlocked with the spool 10, but without requiring rivets, screws or other extraneous fastening devices. The trigger 45 is maintained in one position when the ribbon is wound on its associated spool, (full line position, FIGURE 9) and is adapted to be released when the ribbon has been unwound from the spool, to the dot-dash line, FIGURE 9, for automatically reversing the ribbon driving mechanism 31.

The trigger 45 consists solely of a two-armed lever, the arms extending substantially at right angles to one another. One arm, 46, extends inwardly of hub 21, adjacent the rim thereof, and point 43 presses this arm against the edge of flange 20, at a single point of the trigger 45 adjacent the bend in the trigger 45. The other arm 47 lies under flange 20, when the spool 10 is mounted in its well 30. The rim of hub 21 includes an axial opening 49, through which the arm 46 can proceed to a position externally of the wall of hub 21 when no ribbon is wound about the hub. This motion is caused by the weight of arm 45, which lies generally horizontally while the spool is installed. When the ribbon is wound on the hub 21 it retains arm 46 internally of the hub or at least co-extensive with the exterior wall thereof, and thereby retains arm 47 parallel to flange 20, i.e. in non-triggering position. When the ribbon releases arm 46, arm 47 tilts, of its own weight, into triggering position.

The trigger 45 is illustrated in "spool empty" condition in FIGURE 6, and in "spool full" condition in FIGURE 3.

The slots 41, 42 afford a way in which arm 46 can be inserted fully within the hub 21, after which it can be turned to its final position fitting slackly into a rectangular recess 55, and held therein by point 43.

Referring to FIGURE 8, the trigger 45 consists solely of a bent lever, having a bend 59, and having arms 46 and 47. It requires no metallic elements for effecting attachments to its spool. Formed in the arm 46 is a circular opening 60, located symmetrically of the longitudinal center line of the trigger 45. Intermediate the opening 60 and the bend 59 in the trigger 45, are located two cut-outs 61, 62 which extend inwardly from the edges of the trigger and form a bridge 63, designed to fit slackly within rectangular opening 55 in flange 20, the face of bridge 63 resting against the base of the opening 55.

The trigger 45 can be assembled to its spool by inserting arm 46 into slot 41, and then turning the arm 46 until the end of projection 40 extends into opening 60 and bridge 63 rests against the base of opening 55. See FIGURE 11. Thereafter, the bend can be pushed inwardly, which snaps the end of projection 40 out of opening 60, and into contact with bridge 63, pressing the latter against the base of opening 55. The bridge 63 is now maintained or held between two aligned elements, both in the plane of flange 20, and thus can pivot freely. At the same time trigger 45 is interlocked with its spool and is not readily removable therefrom, since the edges of cuts 61, 62, respectively, straddle the shoulders formed by flange 20 when bridge 63 is in place.

In addition, a pair of tits, 65, 66 lie, respectively, outside the slots 41, 42. When the trigger 45 is being inserted the edges 67 clear the tits 65, 66, but when the trigger 45 is pressed into place the edges 67 of trigger 45 falls behind the tits 65, 66, which prevent translatory movement of the trigger 45 toward the center of flange 20, and thus assist in locking the trigger 45 in place, in respect to all possible motions except the desired tilting motion.

While I have described and illustrated one specific embodiment of my invention, it will be clear that variations of the details of construction which are specifically illustrated and described may be resorted to without departing from the true spirit and scope of the invention as defined in the appended claims.

What is claimed is:

1. A typewriter ribbon and spool assembly, said spool including a hub having an exterior wall, said wall having a gap substantially co-extensive with the length of said hub and parallel to the axis of said hub within which extends a ribbon attaching anchor rod substantially co-extensive with the length of said hub and parallel with the axis of said hub, said rod having one free end and one end anchored to said hub, and a ribbon wound on said spool and including a slit adjacent to and spaced from the end of said ribbon, said slit running over the free end of said anchor rod, whereby a part of the width of said ribbon adjacent said slit lies over said anchor rod exteriorly of said wall and the remaining part of the width of said ribbon lies under said anchor rod interiorly of said wall.

2. A trigger assembly for a typewriter spool, said trigger including two arms bent at an angle to one another, said spool including a flange, said flange including a resilient radial protuberance subsisting in the plane of said flange and secured at one end to said flange, said protuberance being flanked on each side by a slot and being spaced at its unsecured end from said flange by approximately the thickness of said trigger, said flange including a recess opposed to said unsecured end and arranged to secure said trigger against motion transversely of said protuberance, said protuberance retaining said trigger against said recess.

3. The combination according to claim 2 wherein a hub extends centrally of said flange, one of said arms extends approximately axially of said flange into said hub, said one of said arms dimensioned to enter said hub via one of said slots, said arm including an opening arranged and positioned to accept the free end of said protuberance while said one of said arms is being positioned, but displaced from engagement with said protuberance in the final assembled position of said trigger.

4. A typewriter spool and trigger assembly, said spool being plastic and including an axial hub and a wall extending perpendicularly of the axis, a slot in said wall for accepting said trigger, a single rod integral with said wall and extending on the plane of said wall, said rod having an end for pressing against said trigger centrally of said trigger and for providing a sole pivot point with respect to which said trigger pivots.

5. A typewriter spool and two armed trigger assembly, said spool being of plastic and including a flange, said flange including a slot for accepting one arm of said trigger, said slot including a single retaining rod having a free end pressing against said one arm of said trigger centrally of said trigger, said retaining rod being integral with said flange.

6. The combination according to claim 5 wherein said slot further contains shoulders for locking said one arm of said trigger against transverse movement.

7. The combination according to claim 6 wherein said rod is bounded and defined by slot elements, different ones of said slot elements being located on opposite sides of said rod, said slot elements being each adapted to receive said one arm, said one arm including an opening adapted to receive said free end of said rod during movement of said one arm from said one of said slot elements to position against said shoulders during assembly.

8. A typewriter spool and trigger assembly, said spool including an axial hub and a plastic wall extending perpendicularly of the axis of said hub, said wall including a plastic element integral with said wall and extending in the plane of said wall for pivotally securing said trigger to said flange, said plastic element consisting of a single plastic rod having an end pressing on said trigger.

9. A typewriter spool and trigger assembly, said spool including an axial hub, said hub including a single rod extending perpendicularly of the axis of said hub and having a free end pressing on said trigger and providing a sole pivot element for said trigger.

10. A typewriter spool and trigger assembly, said spool being plastic and including a slot for accepting said trigger, a rod integral with said spool, said rod having an end for pressing against said trigger and for providing a pivot point with respect to which said trigger pivots, wherein said trigger includes an opening capable of accepting said rod end during assembly of said trigger in said spool, but displaced from said pivot point.

11. A trigger for a typewriter spool, said trigger including two arms bent at an angle to one another, said spool including a substantially cylindrical hollow core and a coaxially joined substantially circular flange, said flange being confined substantially to one plane, one arm of said trigger extending substantially parallel to the axis of said core, said one arm including inwardly extending slots, said flange including a slot bounded by edges of said flange located in the plane of said flange, said slots of said one arm straddling said edges of said slot of said flange.

12. The combination according to claim 11 wherein is provided a rod device integral with said flange, said rod device being located within said slot of said flange and having a free end pressing against said one arm and retaining said trigger within said slot of said flange.

13. The combination according to claim 12 wherein said one arm of said trigger includes an opening capable of accepting said free end during assembly of said trigger in said spool, but displaced from said pivot point after assembly of said trigger in said spool.

14. The combination according to claim 13 wherein said core includes a pair of parallel slots extending parallel to the axis of said core, said parallel slots defining a ribbon rod formed of the wall of said core.

15. The combination according to claim 14 wherein is provided a ribbon having an opening extending longitudinally of said ribbon adjacent an end thereof, said opening extending over said ribbon rod, said ribbon lying flat against said core.

16. The combination according to claim 15 wherein said opening is a cut.

17. A typewriter ribbon and spool assembly, said spool including a hub having an exterior wall, said wall having a gap extending parallel to the axis of said hub, an elongated ribbon attaching anchor rod subsisting substantially within said gap and extending parallel with the axis of said hub, said rod being free at one of its ends only and a ribbon wound on said spool and including an opening adjacent to and spaced from the end of the ribbon, said opening running over the free end of said anchor rod, part of the width of said ribbon at said opening lying interiorly of said wall and the remaining part of the width of said ribbon at said opening lying exteriorly of said wall.

18. The combination according to claim 17 wherein said opening is a longitudinal slit in said ribbon.

19. A typewriter ribbon and spool assembly, said spool including a hub having an axis and an exterior wall, a rod extending parallel with said axis and located at least adjacent to said wall, said rod having one free end only, a ribbon wound on said hub and including an opening adjacent to and spaced from the end of said ribbon, the free end of said rod extending through said opening, part of the width of said ribbon lying on the exterior side of said rod and the remainder of the width of said ribbon lying on the interior side of said rod.

20. The combination according to claim 19 wherein said rod is substantially in the plane of said wall.

21. The combination according to claim 19 wherein said opening is a slit extending longitudinally of said ribbon.

22. The combination according to claim 19 wherein said rod is substantially in the plane of said wall and said opening is a slit extending longitudinally of said ribbon.

References Cited in the file of this patent

UNITED STATES PATENTS

| | | |
|---|---|---|
| 821,117 | Olmsted | May 22, 1906 |
| 834,947 | Thompson | Nov. 6, 1906 |
| 2,032,214 | Howell | Feb. 25, 1936 |
| 2,276,324 | Mann | Mar. 17, 1942 |
| 2,581,585 | Flaz | Jan. 8, 1952 |
| 2,600,409 | Lippert | June 17, 1952 |
| 2,667,257 | Hurtado | Jan. 26, 1954 |
| 2,737,283 | Prepula et al. | Mar. 6, 1956 |
| 2,873,839 | Bishop | Feb. 17, 1959 |
| 2,880,841 | Heinrich et al. | Apr. 7, 1959 |
| 2,931,482 | Bishop | Apr. 5, 1960 |
| 3,042,180 | Bishop | July 3, 1962 |